Sept. 2, 1952     K. M. GAVER ET AL     2,609,367
GUN REACTION PRODUCT AND PROCESSES
Filed Aug. 30, 1948
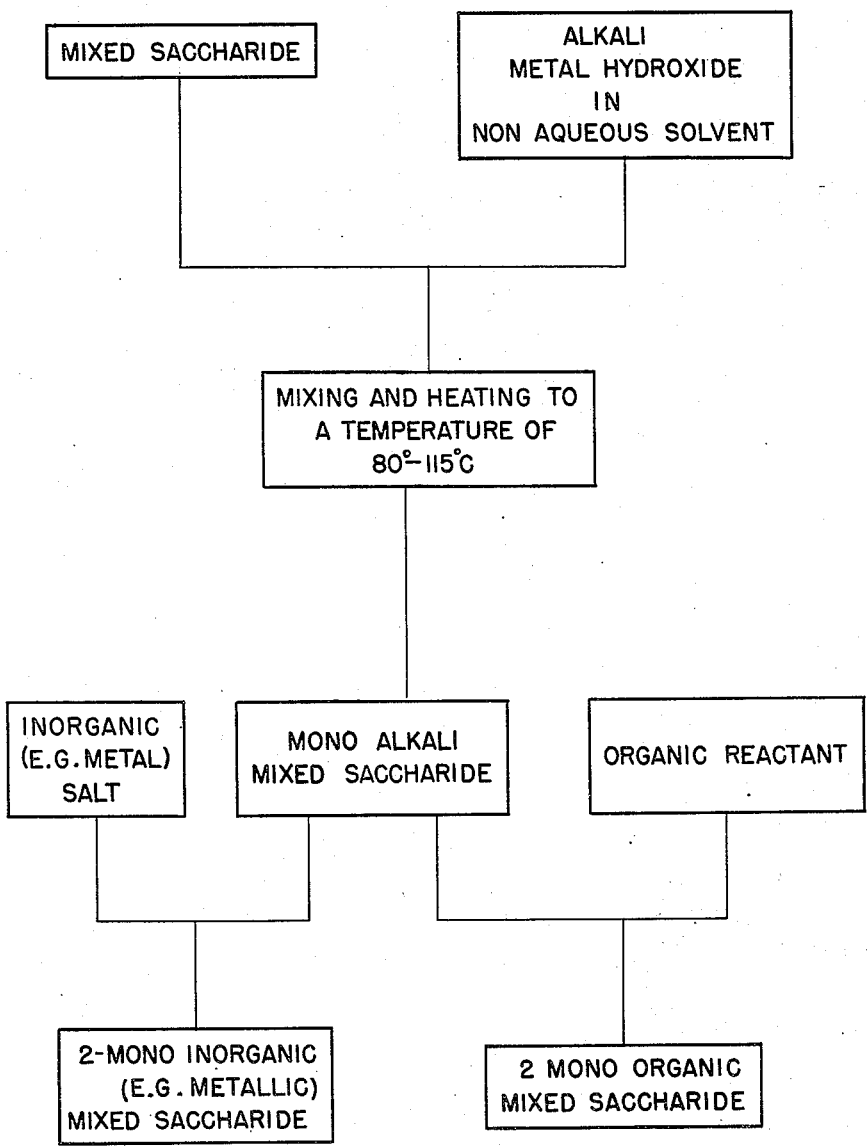
INVENTORS
KENNETH M. GAVER
LEVI M. THOMAS
ESTHER P. LASURE
BY
ATTORNEY Patented Sept. 2, 1952

2,609,367

UNITED STATES PATENT OFFICE 2,609,367

GUM REACTION PRODUCT AND PROCESSES

Kenneth M. Gaver, Esther P. Lasure, and Levi M. Thomas, Columbus, Ohio, assignors to Ohio State University Research Foundation, Columbus, Ohio, a corporation of Ohio Application August 30, 1948, Serial No. 46,866

13 Claims. (Cl. 260—209)

The inventions disclosed in this application relate to new compositions of matter and new processes for the formation of such compositions. The processes described herein illustrating our invention are designed to produce new products from mixed saccharides such as: Condensed amino saccharides; mixed pentosans; and mixed hexosans.

By suitable reacting of these substances we are able to obtain new monosubstituted mixed saccharides including new monoalkali saccharides, new monometallic mixed saccharides, new monoethers of mixed saccharides, new mono-nonmetallic inorganic mixed saccharides and new monosubstituted saponified mixed saccharides.

The products which we are thus able to form are useful as adhesives, as sizing materials, as gel producing materials and in various other ways and as intermediates in the formation of such materials and in the formation of synthetic plastics.

The definition of the term saccharide as used in this specification and claims is "a compound of an organic base with sugar." It is intended to include amino saccharides, mixed pentosans and mixed hexosans. The mixed saccharides are sometimes considered as consisting of (1) the gums and mucilage group consisting of mixtures of saccharides and uronic acids; (2) those tannins which consist mainly of mixtures of phenolic substances and saccharides; and (3) the glucosides consisting of mixtures of saccharides and some other compounds.

We have discovered now that when a mixed saccharide is reacted with an alkali metal hydroxide or with an alkali metal alcoholate in solution in a non-aqueous solvent (preferably in an alcoholic solvent) a monoalkali substituted product may be formed. The reaction varies depending upon whether the constituent which is mixed with the saccharide contains a carboxyl group or does not contain a carboxyl group. If a carboxyl group is contained (as in pectin and karaya gum) the addition of the alkali metal first reacts to saponify the ester group. Thereupon these saponified mixed saccharides behave as low molecular dextrins and become readily soluble in water and do not gel. If additional alkali (as for example, sodium hydroxide or a sodium alcoholate) is added to the mixture and it is heated to 80° C. or higher an additional reaction takes place. In such additional reaction, the hydrogen of the hydroxyl group positioned on the carbon atom next adjacent to the carbonyl group of the saccharide is also replaced. This replacing will later be discussed more in detail. That is to say we have now discovered that when mixed saccharides are reacted with an alkali metal hydroxide or alkali metal alcoholate in a non-aqueous solvent at a temperature of from 80–81° C. or higher up to about 115° C. the alkali metal is substituted for the hydrogen of the most acidic hydroxyl group of the saccharides to form a monosubstituted saccharide.

One of the objects of our inventions therefor is the provision of new and useful processes of forming new and useful substituted mixed saccharides.

A further object of our inventions is the provision of new and useful substituted mixed saccharides.

A further and more specific object of our inventions is the provision of new and useful processes of forming 2-monosubstituted mixed saccharides.

A further object of our inventions is the provision of new alkali metal substituted mixed saccharides, inorganic substituted mixed saccharides, and mixed saccharide ethers in which the substituted group becomes attached to the carbon next adjacent to the carbonyl group.

Further objects and advantages of the present invention will be apparent from the following description, reference being had to the accompanying drawings wherein a preferred form of embodiment of the invention is clearly shown.

In the drawings the figure is a flow sheet illustrating the process of forming 2-monosubstituted products of mixed saccharides.

In general the inventions disclosed herein are illustrated by processes of forming a 2-monosaccharide (mixed) ether and a 2-monometallic saccharide (mixed) in which the mixed saccharide is first treated with a non-aqueous solution of an alkali hydroxide at a temperature of from 80–81° C. or higher up to about 115° C. (preferably at about 92° C. in butanol) so that the alkali metal hydroxide reacts with the saccharide unit of the mixed saccharide to replace by the alkali metal the hydrogen of the hydroxyl group next adjacent to the carbonyl group thereof so as to form a 2-monoalkali mixed saccharide. This 2-monoalkali mixed saccharide is then reacted with an alkyl halide or similar organic reactant to substitute an organic group in place of the alkali metal of the substituted mixed saccharides to form a mixed saccharide ether in which the organic group is attached in all cases to the carbon atom next adjacent to the carbonyl group. Alternatively the monoalkali mixed saccharide may be reacted with a metal salt or other inorganic salt to form a metal or other inorganic mixed substituted saccharide. In preparing the 2-monoalkali mixed saccharides, the 2-monoorganic mixed saccharides, and the 2-monoinorganic mixed saccharides referred to above, we have investigated the effect of the following factors on the reaction.

NATURE OF SOLVENT

The solvent must be non-aqueous and is preferably alcoholic. It has been found that any of the following alcohols could be used, provided that certain other variables are sufficiently controlled. It must be understood, however, that not all solvents mentioned have the same utility in the process. It must also be understood that any other non-aqueous solvent which will dissolve the alkali even in small amounts is a suitable vehicle in which to carry out the reaction provided that certain other variables are sufficiently controlled. The following alcohols as well as others are satisfactory:

| | | |
|---|---|---|
| iso-amyl | sec.-butyl | n-hexyl |
| n-amyl | tert.-butyl | sec.-hexyl |
| sec.-amyl | ceryl | methyl |
| tert.-amyl | cetyl | n-nonyl |
| n-butyl | ethyl | decyl |
| iso-butyl | n-heptyl | n-octyl |
| octanol-2 | n-propyl | iso-propyl |

It is clear that all non-aqueous solvents capable of dissolving sodium hydroxide to the extent of 0.04 N or higher are satisfactory. Some of the lower alcohols (such as methanol and to a lesser extent ethanol, propanol, etc.) which readily give up a hydrogen ion in solution are not satisfactory with all types of alkali because of the relatively high acidity of such alcohols. The use of butanol as a solvent is particularly advantageous. As suggested above, the reaction usually occurs at a temperature of from 80–81° C. or higher and as will later be pointed out, the reaction causes the formation of water by uniting the hydrogen of the hydroxyl group of the saccharide with the hydroxyl of the alkali hydroxide or alcoholate. Moreover the reaction is accelerated by the removal of water, inasmuch as water seems to deter the reaction. Now, while butanol boils at about 115° C., the azeotrope of butanol with water boils at about 92° C. Accomplishing the reaction at about 92° C. all or substantially all of the water which is formed by the reaction (and any other water which incidentally may be present) is removed as the butanol azeotrope without removing any excess butanol and thus without wasting any of the solvent. Also 92° C. (being above the critical point of 80–81° C.) is a very satisfactory temperature for the reaction while at the same time not requiring an excessive amount of heat.

TEMPERATURE

Any temperature of from 80–81° C. up to about 115° C. in an open or closed system which permits the volatilization of the water produced by the reaction produces a 2-monoalkali mixed saccharide substituted product. If the system is closed so that the water produced by or involved in the reaction is retained in the reaction mixture, then the reaction will yield a 2-monoalkali substituted product at any reasonable temperature above 80–81° C. Somewhere above 115° C. in an open system, another reaction occurs and the product is no longer a 2-monoalkali substituted product but is largely a polysubstituted product. On the other hand, under strongly dehydrating conditions (e. g., with alcoholates) this monoalkali reaction can be driven to completion at temperatures even lower than 80° C. However, under usual operating conditions the raising of temperature up above about 80–81° C. is one of the most important considerations.

PRESSURES

Apparently there is very slight volume change occurring in the monoalkali reaction. Pressures up to about 55 lbs. have been used with no effect on the course of the reaction or upon the product produced by the reaction. It is very probable that any pressure may be used provided the temperature and other requirements are met, and provided the water produced by the reaction does not interfere.

TIME OF REACTION

The time of the reaction varies with the solvent chosen but more especially with the temperature. With ethyl alcohol any time beyond two hours does not alter the course of the reaction nor the character of the product. With butanol the reaction is complete well before the butanol (technical grade) reaches the boiling point of 115° C. A generalization may be made that the reaction is completed in two hours at 80–81° C. or instantaneously at higher than 81° C.

ALKALI CONCENTRATION

It has been repeatedly demonstrated that at temperatures under the temperature of 115° C. and unless special means are provided to remove water, the reaction is independent of alkali concentration and the same product is always obtained provided there is sufficient alkali present to satisfy the requirements of the product. At the lower temperature range (e. g., about 80° C.), it is advisable to use an excess of alkali in order to complete the reaction within a two hour period. At the higher temperature range (i. e., 81–115° C.), only the amount of alkali approaching the stoichiometric equivalent is necessary or desirable. The mother liquor from the latter reaction always shows a faint alkalinity of approximately 0.04 N.

NATURE OF THE ALKALI

Of the alkali hydroxides only ammonia fails to react. All of the alkali metal hydroxides yield similar products and the alkali metal alcoholates yield products similar to those of the alkali metal hydroxides. For example, sodium hydroxide, sodium methylate, sodium propylate, sodium butylate all yield chemically similar products. Any caustic alkali or alkaline reacting material having an ionization constant of $2 \times 10^{-5}$ or greater will react provided that it is more than very slightly soluble in the chosen reaction solvent and also provided that the molecular size of the reaction molecule is not too large to locate itself so as to react with the mixed saccharide. With the alcoholates a lower boiling alcohol may be used in a closed system inasmuch as then the alcohol cannot evaporate and the water evolved by the reaction is absorbed by the alcoholate. Thus sodium methylate in methyl alcohol in such a case absorbs the water by reacting with the water which has been formed to give more methyl alcohol and sodium hydroxide.

NATURE OF THE MIXED SACCHARIDE

Similar reaction products were produced by using condensed amino saccharides; mixed pentosans; derived pentosans; and mixed hexosans.

There are however two different general types of mixed saccharides. There are those saccharides which in addition to the saccharide contain other substituents some of which contain one or more carboxyl groups and there are those which contain other substituents, none of which contain a carboxyl group. Where the carboxyl group is contained, it is generally as an ester of the saccharide. In such case, the ester groups are first saponified by the alkali hydroxide, such saponification requiring (if there is only one carboxyl group) approximately one mole of the alkali metal hydroxide. Thereafter the hydroxyl group on the carbon atom next adjacent to the carbonyl group of the saccharide is reacted to substitute for the hydrogen thereof the alkali metal and this reaction requires approximately another mole of the alkali metal hydroxide.

As shown in the examples below most of the materials which we have reacted according to our invention are heteropolysaccharides consisting of gums and mucilages such as guar gum, locust bean gum, quince seeds mucilage, gum arabic, karaya gum, etc. These gums and mucilages are especially suitable for the application of our invention.

In substances such as locust bean gum which is a galactomannan having a formula of

$$(C_6H_{10}O_5)X$$

there is present only a negligible quantity of carboxyl groups whereupon only approximately one mole of the alkali metal hydroxide or alkali metal alcoholate is necessary or desirable and in which case substantially all of the alkali metal is substituted on the hydroxyl of the carbon next adjacent to the carbonyl group.

Following are examples illustrating our invention:

Example I

We mixed 200 g. of guar gum
40 g. of NaOH
900 ml. of butanol

We heated with vigorous agitation for two hours at 92–95° C. We added 100 ml. of ethylene chlorohydrin and continued to heat at 92–95° C. for two hours. The product was a guar gum ether (i. e., β-hydroxyethyl ether). We filtered and washed with butanol, then with ether and dried in air. The air dry weight was 241 g.

Example II

We mixed 200 g. of locust bean gum
160 g. of sodium ethoxide
1000 ml. of Cellosolve We heated with vigorous agitation for two hours at 92–95° C. and added the following neutral suspension:

95 g. of monochloroacetic acid
94 g. of sodium bicarbonate
300 ml. of butanol

Then we warmed the mixture with stirring until neutralized.

We then heated this combined mixture for four hours at 92–95° C. with vigorous agitation. We filtered, washed with butanol, then with ether and air dried. The product was a locust bean gum ether (i. e., a monoglycolate). Air dry weight was 318 g.

Example III

We mixed 100 g. of quince seed mucilage
28 g. of potassium hydroxide
700 ml. of amyl alcohol We heated this mixture at 94–99° C. for two hours with vigorous agitation and added 65 ml. of ethyl lactate and continued the heating for two hours during which time the product first curdled somewhat and then again hardened and granulated. We filtered and washed with amyl alcohol and then with ether and air dried. The product was a quince seed mucilage ethyl ether. Air dry weight was 123 g.

Example IV

We mixed 100 g. of gum arabic
20 g. of sodium hydroxide
750 ml. of butanol

We heated with vigorous agitation for two hours at 92–95° C. and while agitating added 135 g. of anhydrous copper chloride and continued to heat for two hours more with continued vigorous agitation.

We filtered and washed with butanol and then with ether and then air dried. The product was an alcoholate (i. e., copper chloro gum arabic). Air dry weight 238 g.

Example V

We mixed 100 g. of karaya gum
28 g. of potassium hydroxide
750 ml. of butanol

We heated with vigorous agitation for two hours at 92–95° C. We then dissolved 85 g. silver nitrate in 100 ml. of water and added 1000 ml. ethanol. We slowly added this solution to the butanol mixture keeping the temperature between 92–95° C. We heated this mixture for two hours at 92–95° C. with vigorous agitation, filtered, washed with butanol and then with ether and air dried. The product was a silver gum (karaya). Air dry weight was 181 g.

Example VI

We mixed 50 g. of α-benzyl glucoside
8 g. of NaOH
300 ml. of pentanol
100 ml. of dioxane We heated with vigorous agitation for two hours at a temperature of 95–98° C. and then added 25 ml. of ethylene chlorhydrin and continued the heating at 95–98° C. for about fifteen minutes when etherification was complete. We filtered, washed with pentanol and then with ether and air dried. The product was β-hydroxy ethyl α-benzyl glucoside. The air dry weight was 75 g.

While the form of embodiment of the present invention as herein disclosed constitutes a preferred form, it is to be understood that other forms might be adopted, all coming within the scope of the claims which follow.

We claim:

1. A composition of matter comprising a 2-mono nonalkali metal metallic gum in which the gum is selected from the group consisting of guar gum, locust bean gum, gum arabic, and karaya gum.

2. A process of treating a heteropolysaccharide gum selected from the group consisting of guar gum, locust bean gum, gum arabic, and karaya gum which comprises replacing the hydrogen atom of the hydroxyl group which is adjacent to the carbonyl group by an alkali metal atom by treating said heteropolysaccharide gum with a non-aqueous alcoholic solution of a material selected from the group consisting of the alkali metal alcoholates and the alkali metal hydroxides at a temperature of from 80° C. to about 115° C.

3. A process of treating a heteropolysaccharide gum selected from the group consisting of guar gum, locust bean gum, gum arabic, and karaya gum, the molecule of which contains a carbonyl group and a plurality of hydroxyl groups, one of the latter always being adjacent to the carbonyl group, which comprises replacing the hydrogen atom of the hydroxyl group which is next adjacent to the next carbonyl group with an alkali metal atom by treating the heteropolysaccharide gum with a non-aqueous alcoholic solution of a material selected from the group consisting of the alkali metal alcoholates and the alkali metal hydroxides at a temperature of from about 80° C. to 115° C.; and then reacting to substitute an inorganic group in place of the alkali metal atom.

4. A process of forming an alkali monometallic heteropolysaccharide gum which comprises treating a heteropolysaccharide gum selected from the group consisting of guar gum, locust bean gum, gum arabic, and karaya gum with a non-aqueous alcoholic solution of an alkali metal hydroxide at a temperature of from 80° C. to about 115° C.

5. A process of forming an alkali monometallic heteropolysaccharide gum which comprises treating a heteropolysaccharide gum selected from the group consisting of guar gum, locust bean gum, gum arabic and karaya gum with a butanol solution of an alkali metal hydroxide at a temperature of from 80° C. to about 115° C. to form a 2-alkali metal heteropolysaccharide gum.

6. A process of producing a sodium substituted gum which comprises the reaction of a gum selected from the group consisting of guar gum, locust bean gum, gum arabic and karaya gum by treating with a non-aqueous alcoholic solution of sodium hydroxide at a temperature of about 80° C. to about 115° C., the sodium hydroxide being present in at least equimolar quantities with the gum.

7. A method of making an alkali metal substituted heteropolysaccharide gum from a heteropolysaccharide gum selected from the group consisting of guar gum, locust bean gum, gum arabic and karaya gum comprising dissolving an alkali metal hydroxide in an alcohol adding the solution to said heteropolysaccharide gum; and refluxing the mixture at a temperature of from 80° C. to about 115° C. until the reaction is complete.

8. A process for the treatment of heteropolysaccharide gums comprising the dissolving of an alkali metal hydroxide in a substantially non-aqueous alcoholic solvent which has a boiling point higher than about 80° C. and which will dissolve the alkali metal hydroxide to an extent corresponding to a solution of sodium hydroxide in ethanol to an extent of 0.04 N or higher; treating a heteropolysaccharide gum selected from the group consisting of guar gum, locust bean gum, gum arabic and karaya gum with the solution at a temperature from 80° C. to 115° C. until the gum has reacted with the alkali metal hydroxide to form water and an alkali alcoholate of the carbohydrate material; and removing the water.

9. The process of forming an alkali gum which comprises treating a heteropolysaccharide gum selected from the group consisting of guar gum, locust bean gum, gum arabic, and karaya gum with a non-aqueous alcoholic solution of an alkali metal alcoholate in a non-aqueous alcoholic solvent at a temperature of from 80° C. to 115° C.

10. The process of forming a metal substituted gum which comprises treating a heteropolysaccharide gum selected from the group consisting of guar gum, locust bean gum, gum arabic, and karaya gum with a non-aqueous alcoholic solution of an alkali substance selected from the group consisting of alkali metal hydroxides and alkali metal alcoholates in a non-aqueous alcoholic solvent at a temperature of from 80° C. to 115° C. to produce an alkali metal heteropolysaccharide gum; and thereafter reacting the alkali metal heteropolysaccharide gum with a metal salt to produce a monometallic non-alkali metal heteropolysaccharide gum.

11. The process of forming a non-metal inorganic substituted gum which comprises treating a heteropolysaccharide gum selected from the group consisting of guar gum, locust bean gum, gum arabic, and karaya gum with a non-aqueous alcoholic solution of an alkali substance selected from the group consisting of alkali metal hydroxides and alkali metal alcoholates in a non-aqueous alcoholic solvent at a temperature of from 80° C. to 115° C. to produce an alkali metal heteropolysaccharide gum; and reacting the alkali metal heteropolysaccharide gum with a non-metal inorganic salt to produce a mono non-metal inorganic heteropolysaccharide gum.

12. A composition of matter comprising a 2-mono ether gum derivative selected from the group of gum derivatives consisting of derivatives of guar gum, locust bean gum, gum arabic and karaya gum.

13. A composition of matter comprising a 2-mono substituted gum in which the substituent on the 2 carbon of the aldohexose units of the gum is a cation selected from the groups consisting of cations of ethereal salts and the cations of metallic salts and in which the gum is selected from the group consisting of guar gum, locust bean gum, gum arabic, and karaya gum.

KENNETH M. GAVER.
ESTHER P. LASURE.
LEVI M. THOMAS.

REFERENCES CITED

The following references are of record in the file of this patent:

UNITED STATES PATENTS

| Number | Name | Date |
|---|---|---|
| 2,294,925 | Miller et al. | Sept. 8, 1942 |
| 2,397,732 | Gaver | Apr. 2, 1946 |

OTHER REFERENCES

Mantell, The Water-Soluble Gums, 1947, pages 1, 120.

Pigman, "Carbohydrate Chemistry," 1948, Academic Press, page 513, 1 page.

Schmid et al., Ber. V. 58 (1925), pages 1966–1968, 3 pages.

Hockett et al., JACS V. 65 (1943), pages 403–409, 7 pages.